United States Patent
Santhar et al.

(10) Patent No.: US 10,455,078 B1
(45) Date of Patent: Oct. 22, 2019

(54) ENHANCING PRIVACY IN MOBILE PHONE CALLS BY CALLER CONTROLLED AUDIO DELIVERING MODES

(71) Applicant: International Business Machines Corporation, Armonk, NY (US)

(72) Inventors: Sathya Santhar, Ramapuram (IN); Sarbajit K. Rakshit, Kolkata (IN); Balamurugaramanathan Sivaramalingam, Paramakudi (IN); Samuel Mathew Jawaharlal, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/032,763

(22) Filed: Jul. 11, 2018

(51) Int. Cl.
| | |
|---|---|
| H04M 1/66 | (2006.01) |
| H04M 1/725 | (2006.01) |
| H04L 29/06 | (2006.01) |
| H04M 3/436 | (2006.01) |
| H04W 12/02 | (2009.01) |
| H04W 88/04 | (2009.01) |

(52) U.S. Cl.
CPC .... H04M 1/72577 (2013.01); H04L 29/0619 (2013.01); H04M 3/4365 (2013.01); H04W 12/02 (2013.01); H04M 1/72519 (2013.01); H04M 1/72522 (2013.01); H04W 88/04 (2013.01)

(58) Field of Classification Search
CPC ........... H04M 1/72577; H04M 3/4365; H04M 1/72519; H04M 1/72522; H04L 29/0619; H04W 12/02; H04W 88/04; H04W 8/245; H04W 88/02

USPC .............................. 455/411, 418, 420, 550.1
See application file for complete search history.

(56) References Cited

U.S. PATENT DOCUMENTS

| | | |
|---|---|---|
| 6,795,544 B1 | 9/2004 | D'Arcy et al. |
| 6,917,680 B1 | 7/2005 | Korn et al. |
| 6,970,724 B2 | 11/2005 | Leung |
| 2005/0277428 A1 | 12/2005 | Nathan Brown |
| 2006/0166652 A1 | 7/2006 | Hwang |
| 2006/0270463 A1 | 11/2006 | Copperman |
| 2007/0006154 A1* | 1/2007 | Yang ................... G06F 11/3636 717/124 |

(Continued)

*Primary Examiner* — Danh C Le
(74) *Attorney, Agent, or Firm* — Scully, Scott, Murphy & Presser, P.C.; Michael O'Keefe, Esq.

(57) ABSTRACT

An apparatus and method for controlling mobile phone settings can include setting up an external speaker or an auxiliary port providing an audio signal output. In particular, the method runs to disable speaker and other audio extension ports thereby providing more control to the caller and preventing mishandling at the receiver's mobile device. The method includes initiating the call, from the calling device, with a non-speaker call signal setting. The receiving mobile interprets such signal and automatically disables the speaker/aux ports of the receiver mobile during the call duration. The apparatus and method implements a speaker disabled call initiated by the sender with the inclusion of a flag set to indicate the speaker disable feature in the signaling mobile channel of the network and be processed and carried over the network to the receiving mobile. The destination mobile resolves the flag to modify device settings to disable speaker and other audio extension ports.

20 Claims, 9 Drawing Sheets

(56) References Cited

U.S. PATENT DOCUMENTS

| | | | |
|---|---|---|---|
| 2008/0089513 A1 | 4/2008 | Kotzin et al. | |
| 2008/0220715 A1* | 9/2008 | Sinha | H04W 48/04 |
| | | | 455/1 |
| 2010/0134242 A1* | 6/2010 | Ohta | G01C 21/3688 |
| | | | 340/5.1 |
| 2011/0053612 A1* | 3/2011 | Lipovski | H04M 1/72552 |
| | | | 455/456.4 |
| 2011/0158396 A1* | 6/2011 | Eichen | H04M 3/42229 |
| | | | 379/229 |
| 2014/0101748 A1* | 4/2014 | Ancona | G06F 21/566 |
| | | | 726/12 |
| 2014/0133683 A1* | 5/2014 | Robinson | H04S 3/008 |
| | | | 381/303 |
| 2014/0376740 A1* | 12/2014 | Shigenaga | G06F 21/60 |
| | | | 381/92 |
| 2015/0334668 A1* | 11/2015 | Weber | H04W 56/001 |
| | | | 455/404.1 |
| 2016/0360417 A1* | 12/2016 | Lee | G06F 12/0246 |

\* cited by examiner

ENHANCING PRIVACY IN MOBILE PHONE CALLS BY CALLER CONTROLLED AUDIO DELIVERING MODES

BACKGROUND

The present invention generally relates to mobile phone communications, and an apparatus and method for controlling audio delivery in a remote mobile phone or connected phone device from a calling phone for purposes of controlling privacy.

BACKGROUND

While current mobile phone calls offer much needed flexibility for communicating no matter with respect to locations, oftentimes mobile phone calls between two people occur while the called party is in a public environment.

There are situations where the caller (i.e., Calling Party) only wants to talk with the receiver (i.e., Called Party) and without the risk of being exposed (such as in a conference with other parties) or audibly heard by another third party who happens to be in the vicinity of the called party whether accidentally or deliberately.

SUMMARY

One embodiment of the present invention is a system, method and computer program product providing an ability to render a call private such that a calling party is prevented from getting exposed over the speakers at a device associated with the called party.

The system, method and computer program product in one embodiment renders a disabling of the Audio Out/Aux port of the called party's mobile phone during the entirety of a mobile phone call such that the called party is restricted to only partake in the call by only using the earphone of the mobile phone.

According to one embodiment, there is provided a method for enhancing mobile cell phone privacy. The method comprises: receiving, at a mobile phone device, signals from a calling party mobile device communicated over a network for initiating a phone call with a called party, the received signals including a flag bit set for enhancing privacy of the call received at the mobile phone device; determining, at a processor of the mobile phone device, presence of the set flag bit from the received initiating phone call signals; generating for display at a phone device interface at the mobile device user-selectable choices for accepting the calling party's call with an enhanced privacy indicator or not accepting the call; responsive to a user accepting the call from the calling party with the enhanced privacy indicator via the interface, modifying, using the mobile phone processor, a mobile phone device setting that disables a speaker and disables an audio extension port, wherein a call set up for the accepted call is established with the device mobile phone device settings modified.

In a further embodiment, there is provided a method for enhancing mobile cell phone privacy. The method comprises: setting, via a processor at a mobile phone device of a caller, a flag bit in a signal used for initiating a phone call with a receiver mobile phone of a called party according to a communications protocol; and communicating the signal over a communications channel-network for establishing a phone call with a mobile phone device of a called party over a network; wherein responsive to reading a flag bit set in the called party mobile device of a called party, activating a processor at the called party mobile phone to modify a mobile phone device setting that disables a speaker and disables an audio extension port, wherein a call channel is established with the device mobile phone device settings modified to enhance calling party privacy at the called party's mobile phone device.

In a further embodiment, there is provided a mobile phone apparatus with enhanced privacy for a calling party. The apparatus comprises: a Radio Frequency sub-system for receiving signals from a calling party mobile device communicated over a network, the signals for initiating a phone call with a called party, the received signals including a flag bit set for enhancing privacy of the call received at the mobile phone device; a processor of the mobile phone device running program code for determining presence of the set flag bit from the received initiating phone call signals; a display at the mobile device, wherein, responsive to determining presence of the set flag bit from the received initiating phone call signals, the processor generating for the display a user-selectable choice of accepting a call with an enhanced privacy indicator for the calling party or not accepting the call; the mobile phone processor, in response to a user selecting accepting the call with the enhanced privacy indicator, modifying the mobile phone device setting that disables a speaker and disables an audio extension port, wherein a call set up for the accepted call is established with the device mobile phone device settings modified.

In a further aspect, there is provided a computer program product for performing operations. The computer program products include a storage medium readable by a processing circuit and storing instructions run by the processing circuit for running a method. The method is the same as listed above.

BRIEF DESCRIPTION OF THE DRAWINGS

Objects, features, and advantages of the present disclosure will become more clearly apparent when the following description is taken in conjunction with the accompanying drawings, in which.

DETAILED DESCRIPTION

A system, methods and computer program products configuring a mobile phone or like mobile device to automatically restrict a received call audio output by disabling the use of the audio output to a speaker or auxiliary ("aux") output port at the mobile or like phone device.

The system and method provides logic for controlling features such as a loudspeaker etc., e.g., of a receiving mobile phone device, from a calling mobile device while initiating a call or during a call.

More specifically, the method includes the feature of initiating the call, from the calling device, with a signal (non-speaker call) setting, wherein the receiving mobile interprets such signal (non-speaker call) and speaker/aux ports of the receiver mobile are automatically disabled during the call duration.

The embodiments described enhance mobile phone user privacy by avoiding getting exposed over the called party device's speakers, and disabling the Audio Out/Aux port during the entirety of the call, and/or by restricting the called party to only the earphone of the mobile phone.

In one aspect, the controlling of the call from being made public is solely controlled by the called party and there is no option for the receiver (called party) to switch to speaker mode and take audio out, and so there is no need for indicative messages/display messages to be sent back to the called party, thus giving the audio mode control at the receiver's end to the caller.

The only option given to the receiver (the called party device) is to accept/reject such audio mode controlled calls. The calling party decides to make an audio mode controlled call during the call initiation and the called party has to either accept or reject during the time call is received.

Commensurate with the call establishment, the audio devices settings on the called party device end automatically gets locked from usage of hands free/speakers/audio out and the calling party need not make any changes/decisions based on the privacy state/hands-free flag value in the message of the call. If such call is not possible at the receiver's end due to device and/or user's restrictions, sender is notified that such call cannot be established.

In one embodiment, the flag that the call is 'speaker disabled' is sent in the mobile device communication signaling channel which gets resolved by the mobile device at the receiving end and the settings are changed to lock the speaker/aux modes at the receiver mobile device.

Figure 1:
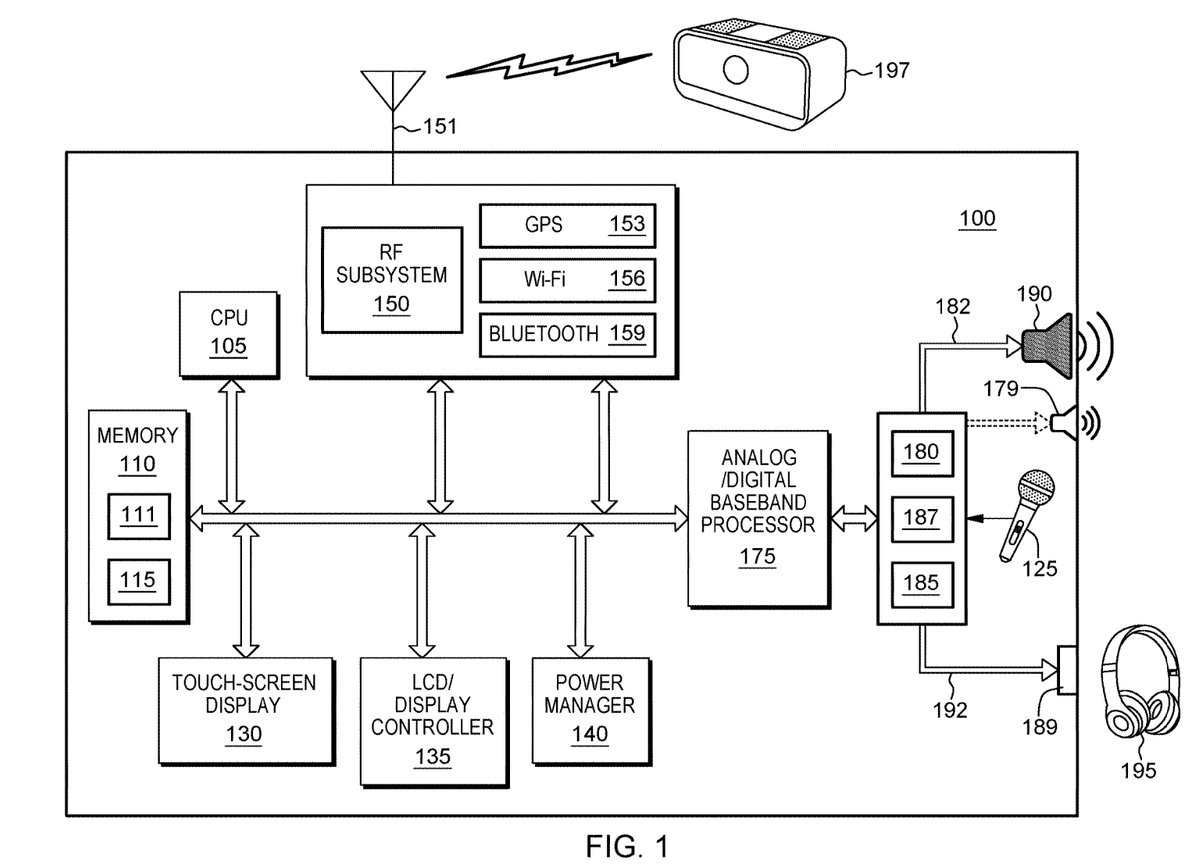
FIG. 1 schematically depicts functional units operating of a mobile phone device for carrying out methods for enhancing mobile phone user privacy in one embodiment.

FIG. 1 schematically depicts functional units operating of a mobile phone device 100 for carrying out methods for enhancing mobile phone user privacy in one embodiment. The mobile phone 100 may be a digital cellular communications device or other radio frequency communications terminal.

Mobile device 100 includes various hardware and software components including but not limited to: a control unit 105 such as a microprocessor (CPU) system with associated memory 110 having at least operating system software 111 and application software 115 for running mobile device operations. Such control processor 105 may invoke/operate components such as a analog and/digital baseband processing units 175 configured for receiving and processing data handling interface operations for a display interface such as touch-screen display interface 130 configured for both input and output operations, any keypad for a user to interface/enter user input signals, a microphone 125 as voice input mechanism, and a camera (not shown). The CPU and analog/digital baseband processing unit 175 may interface with a Radio Frequency (RF) transceiver subsystem 150 to provide analog cellular (baseband) call processing functionality and including an operatively connected antenna 151 for transmitting/receiving cellular phone signals for initiating and conducting mobile phone calls to other parties connected over a communications network as known in the art. Further functional units provided in phone 100 may include a global positioning system (GPS) receiver 153 for providing real-time location information. Further, in one embodiment, mobile phone device is equipped with wireless communications technologies and communication protocols such as Bluetooth® 159, WIFI (e.g., 802.11a/b/g/n) 156, cellular networks (e.g., CDMA, GSM, M2M, and 3G/4G/4G LTE), near-field communications systems, satellite communications, via a local area network (LAN), via a wide area network (WAN), or any other form of communication that allows mobile phone device 100 to transmit information to or receive information.

Digital processing may further include components such as a screen display interface controller 135 to provide any operating LCD and touch-screen display processing functionality. Other features such as a battery power/power management system 140, any video output interfaces and/or USB interfaces are not shown. The CPU circuit 105 of FIG. 1 handles all internal processing, e.g., such as signal processing, data encoding and decoding operations, etc., as known in the art.

Although not shown, for processing input of audio signals received from a communications terminal such as another land-line or mobile phone device typically during speech communication with a remote party, device 100 further includes audio processing components, including any signal filters, gain amplifiers and/or audio speaker drivers, switch (es), any volume/mute control components, and any audio coding/decoding operations (codec) performed by an audio codec unit (not shown). In one embodiment, an audio switch 187 provide functions for providing an output audio signal path 182 to a first (built-in terminal) audio speaker 190 via a speaker drive component 180, or alternatively, a second output audio signal path 192 to a second external headset or accessory speaker 195 such as audio headphones, phone earpiece headphones, e.g., via a drive component 185 for driving an audio output or "auxiliary" audio port 189. It is understood that terminal speaker 190 may be two speakers providing audio output in the form of stereo audio output signals.

An additional "earphone" speaker 179 is depicted being driven by the same or a separate speaker drive component 180 to provide a lower power audio signal via the phone's ear speaker so a called party R would be able to hear and converse with the calling party C even with the external speaker 190 and speaker auxiliary port 189 disabled.

In one embodiment, a further audio signal path (not shown) is enabled for providing an audio signal output to a hands-free blue-tooth (or like wireless connector) unit 159, e.g., providing a Bluetooth interface, for wireless communication with an external wireless speaker unit 197.

In embodiments, the mobile device 100 is configured in ordinary use for telephone communication purposes where a user will speak into microphone 125 (or a microphone of a headset not shown) for entering audio signals, which audio signals are processed and encoded to a cellular radio signal by means of control device 105 in the device. The radio signal is subsequently transmitted to a receiving party device by means of a like RF transceiver subsystem 150 connected to an antenna 151.

In accordance with the invention, programmed instructions such as provided in a device firmware (not shown), or operating system software, e.g., provided in a memory 110, is configured to control operation of the audio paths including enabling a disconnection of audio path 182 to the built-in speaker 190, a disconnection of the audio path 192 to the external or auxiliary audio port, controlling the Bluetooth unit 159 or wireless connector to disable wireless transmitting of received audio signals, and/or a deactivation of the audio drivers providing audible audio signals at the device.

That is, it is possible for the mobile device terminal speaker 190, external accessory speaker 195 or an external wireless speaker unit 197 to be disabled, thus enhancing the calling party's privacy.

In an embodiment, mobile phone device 100 is configured to operate in a switched cellular communications network, as typically known, by communicating with a cellular phone base station.

Figure 2:
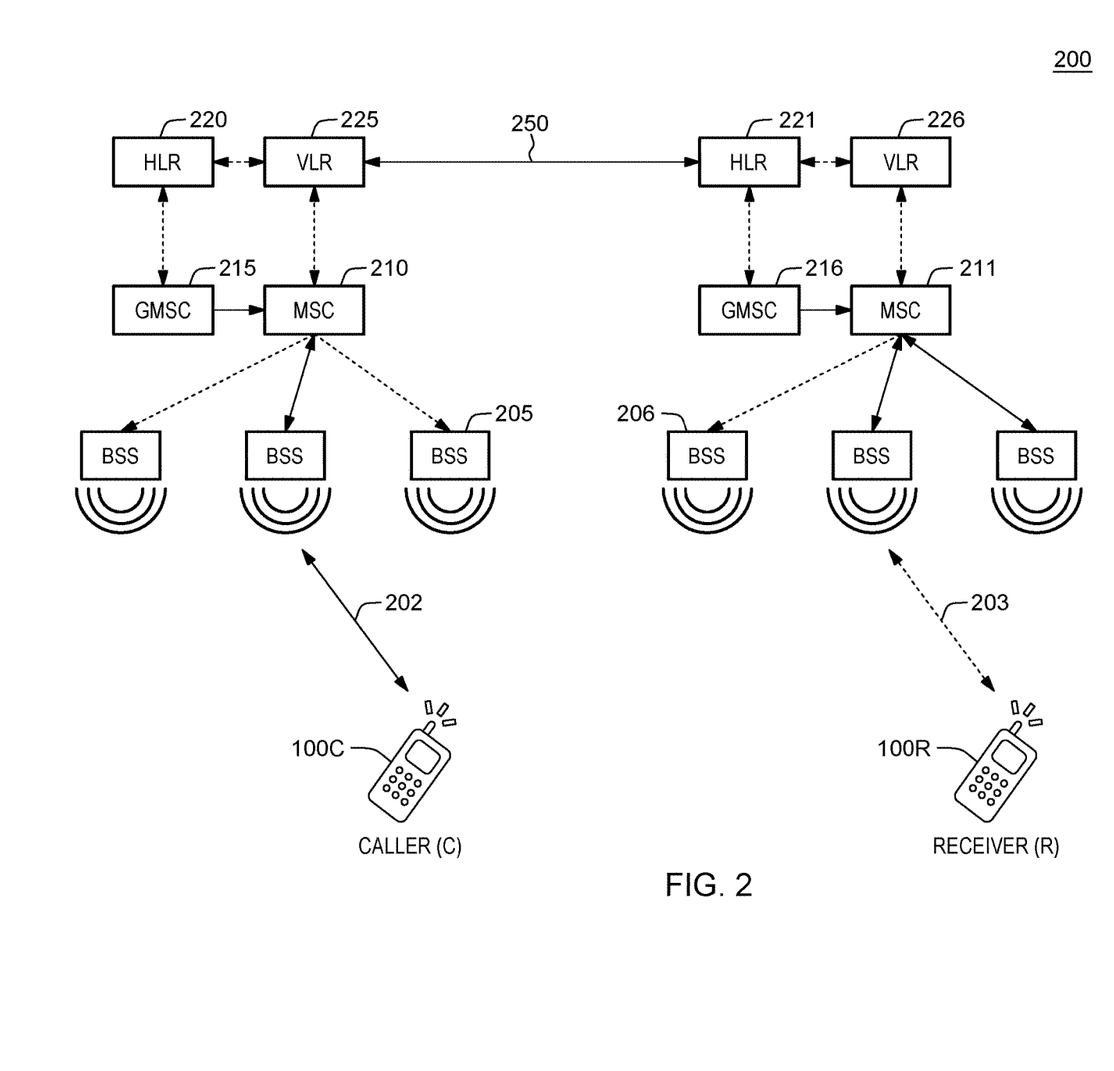
FIG. 2 depicts several elements of a switched cellular communications network for enabling mobile phone communications between a caller party (caller C) associated with sending mobile phone and a receiver party (receiver R) associated with receiver mobile phone.

FIG. 2 depicts several elements of a switched cellular communications network 200 for enabling mobile phone communications between a caller party (caller C) associated with sending mobile phone 100C and a receiver party (receiver R) associated with receiver mobile phone 100R. In one embodiment, network 200 may be part of a Global System for Mobiles (GSM) network although any public land mobile network (PLMN) may be used, e.g., time division multiple access (TDMA) network or code division multiple access (CDMA) network.

As known, a cellular phone call initiated by a caller device 100C, i.e., a mobile phone, a mobile station (MS) or GSM handset, is wirelessly communicated to the GSM network 200 over a communications channel 202 and received at a mobile communications network base station system (BSS) 205, e.g., a radio endpoint of a plural geographically distributed base stations, typically having an associated base station controller (not shown) that routes the call to a mobile service switching centre (MSC) 210 that provides core switching functions in the network 200. The BSS 205 may additionally interface with a public switched telephone network (PSTN) not shown. As known, the users (subscribers) of the GSM network 200 are registered with the MSC 210; all calls to and from a user (e.g., caller C) are controlled by the MSC. A GSM network has one or more MSCs geographically distributed.

In one embodiment, a Gateway MSC (GMSC) 215 is a switching entity that controls mobile terminating calls. When a call is established towards a GSM subscriber (e.g., a receiver R), a GMSC contacts a Home Location Register (HLR) 220 of that subscriber, to obtain the address of the MSC where that subscriber is currently registered. That MSC address is used to route the call to that subscriber over a communications channel 250. As known, the HLR 220 is a database that contains a subscription record for each subscriber of the network. A GSM subscriber is normally associated with one particular HLR. The HLR is responsible for the sending of subscription data to a Visitor Location Register (VLR) 225 that contains subscriber data for subscribers registered in an MSC. Every MSC 210 contains a VLR 225. Although MSC and VLR are individually addressable, they may be contained in one integrated node.

As shown in FIG. 2, like GSM network components such as HLR 221, VLR 226, GMSC 216 and MSC 211 are invoked for processing and forwarding a cellular phone call received over channel 250 from caller C device 100C to the receiver R device 100R which receives the call from a network endpoint base station system (BSS) 206 over a communications channel 203.

In an embodiment, the caller C associated with calling mobile station device 100C wants to ensure privacy of his/her call by disabling the speaker such as the Audio out/external port of the called caller B's destination mobile device 100R.

Figure 3:
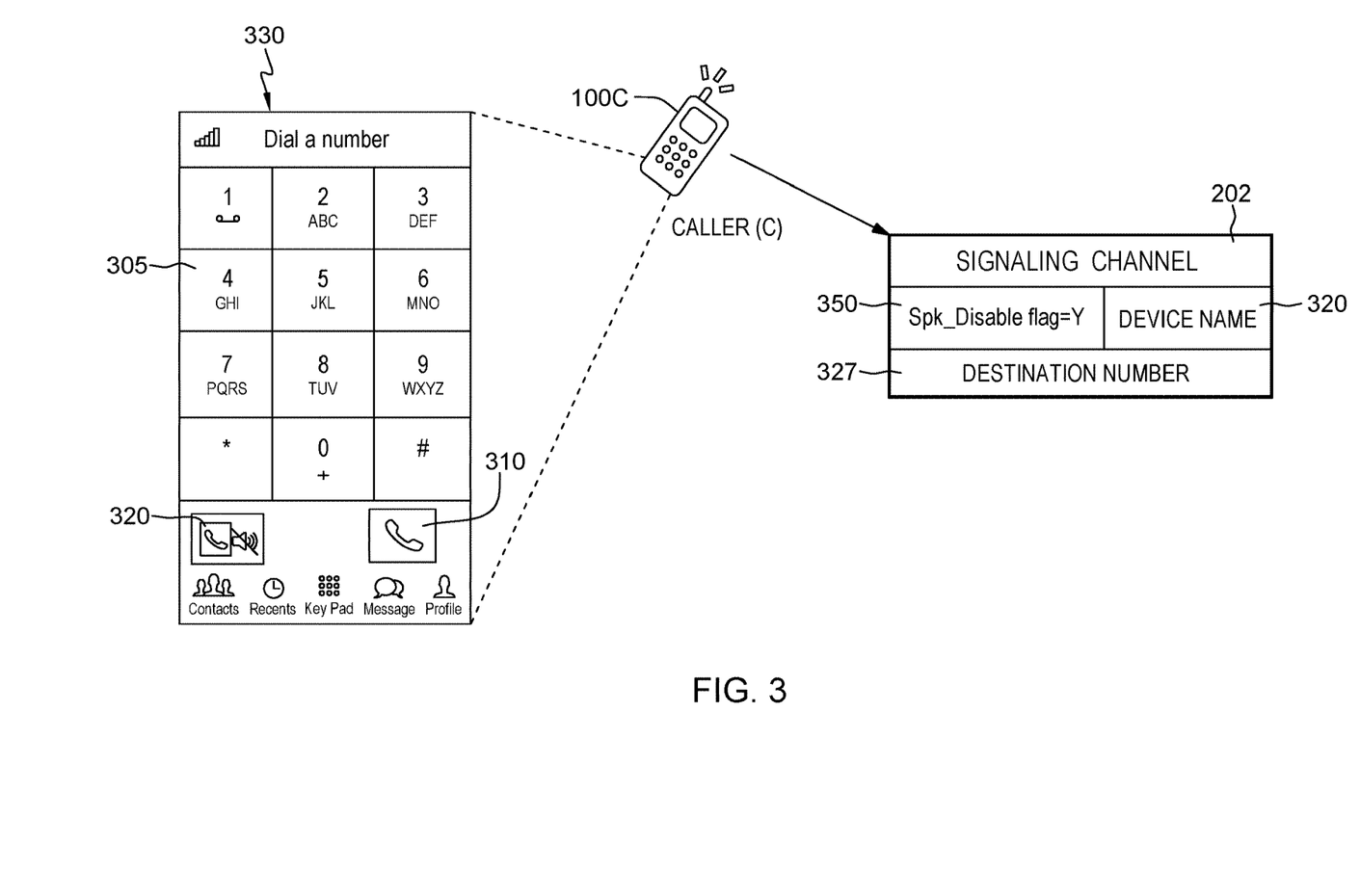
FIG. 3 depicts, at the caller's mobile device, while dialing/initiating any call, instructions at the mobile device enabling the caller to select a) Regular Call option; or b) a Speaker disabled call option via a mobile phone call dialing (touch-screen) interface.

As shown in FIG. 3, at the caller's mobile device 100C, while dialing/initiating any call, software instructions at the mobile device 100C present caller C with various call/dial options via a mobile phone call dialing (touch-screen) interface 305. For example, in FIG. 3 via the touch-screen display interface 305, the caller C is presented with two dial options: a) Regular Call option; or b) a Speaker disabled call option. In particular, FIG. 3 shows the call dialing interface 305 at the caller C's mobile device 100C presenting a typical call send select button 310 for initiating a regular call option; or a call disabled send select button 320 for initiating a Speaker disabled call option.

While the selection of the regular call option 310 may be resolved and processed according to known functionality for handling a regular call, responsive to the selecting of the Speaker disable call option 320, the caller mobile device 100C enables specification of a speaker disable flag which is provided in the signaling channel 202 to the GSM network backbone and carried to the receiver end device 100R. In particular, as shown in FIG. 3, upon selecting a call disabled send select button 320 for initiating a Speaker disabled call option, the mobile device processing sets a speaker disable flag 350 (e.g., Speaker Disable Flag='Y'), and with the caller device name 320 and destination phone number 327 of the receiver (called party) device 100R as dialed by the user, which is sent over the signaling channel 202 to the GSM network for receipt at the receiver device 100R, in the manner as described with respect to FIG. 8.

Figure 4:
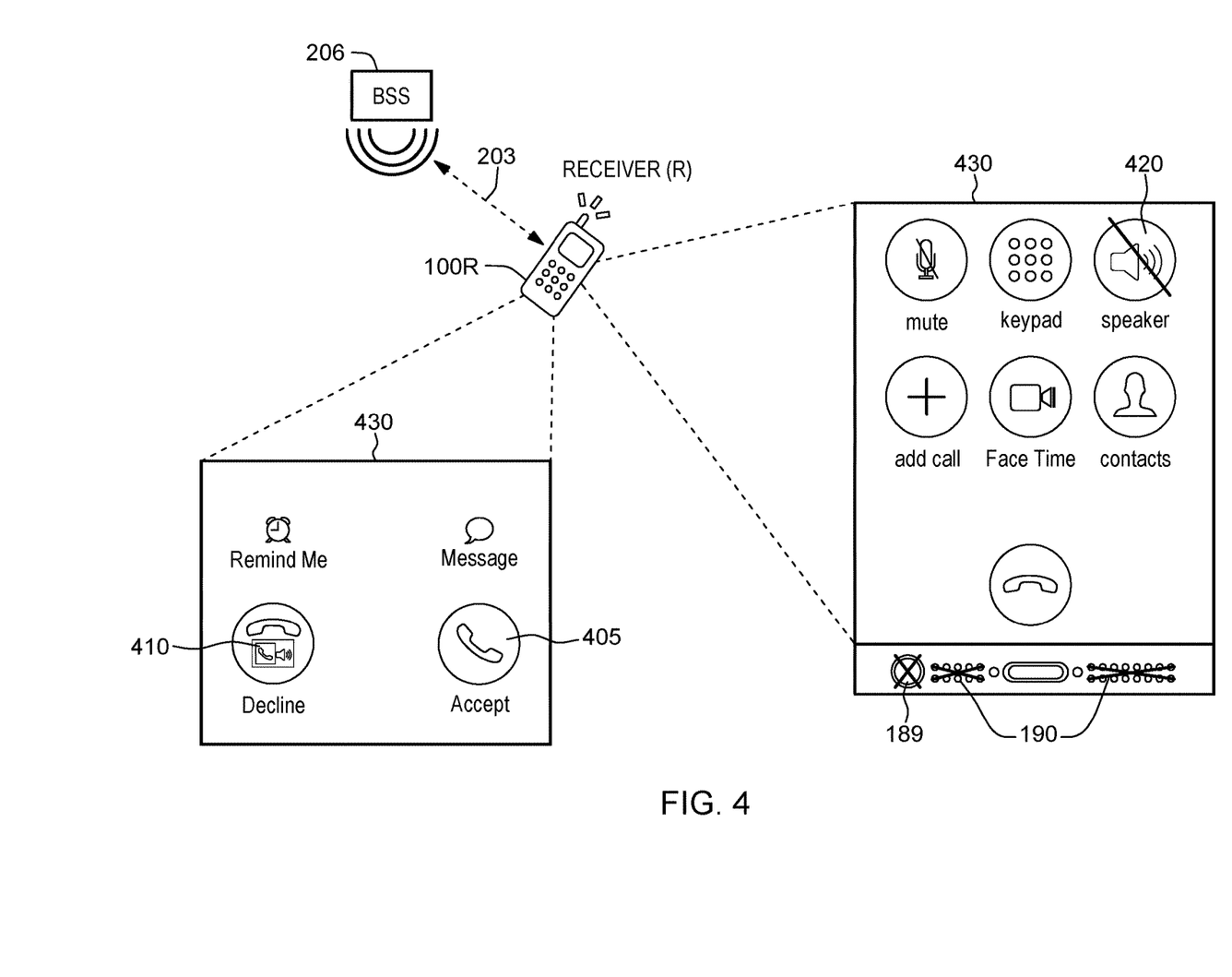
FIG. 4 depicts a receiver R's mobile device receiving the call via a communications channel with a Speaker Disable Flag set, and the responsive triggering at the receiver device to generate visual call interface selections for accepting the call with speaker disabled call option.

As shown in FIG. 4, receiver R's mobile device 100R receives the call from the GSM network destination base station 206 via communications channel 203. In particular, functionality at the receiver R's mobile device 100R, processes the received cellular call signal and evaluates whether a Speaker Disable Flag='Y' had been received. This flag gets resolved at the receiver R's mobile device station (such as by demodulating received signals, and by digitizing the signals received), and as shown in FIG. 4, when determined that the flag has been set, triggers processing at the device's functional components to generate, at the receiver device 100R, visual call interface selections for accepting the call. In particular, a call 'Accept' option 405 is generated for the user selection via receiver R's device touch-screen display 430, and alternatively, a 'Reject Speaker disabled call' option 410 is generated for the user selection.

Accepting, by the called party (caller R), the call 'Accept' option 405 means that the received Speaker disabled call is accepted by the receiver party. Selecting, by the called party (caller R), the 'Reject Speaker disabled call' option 410 means that the call would end with a suitable message communicated back to the caller (C) device 100C, that the caller R did not accept the speaker disabled call.

As further depicted in FIG. 4, responsive to determining the receipt of the set Speaker Disable Flag and the called party (caller R) accepting the Speaker disabled call by accepting the call 'Accept' option 405, the device microcontroller or CPU will invoke functionality at the receiver R's mobile station for disabling the audio output path to the receiver R's device speaker 190 and additionally disabling the audio output path to the receiver device's audio out/aux ports as indicated at 189. Furthermore, once the Speaker disabled call is accepted, the receiver R's mobile device 100R will visually indicate via device interface 430 that the speaker phone option 420 is disabled as the device settings are made once the Speaker Disabled flag is identified as "Y" in the signal of the (Speaker disabled) call at the receiver end.

In one embodiment, once the call is accepted as Speaker disabled call, the receiver R's device 100R is configured to have the speaker 190, Audio out/Aux port 189 disabled throughout the entirety of the call and would not be able to change the setting during the course of the call. Additionally, any short range wireless communications functionality such as Bluetooth, may have functionality disabled such that the receiver R may not transmit the audio output wireless to a remove wireless speaker.

Figure 5:
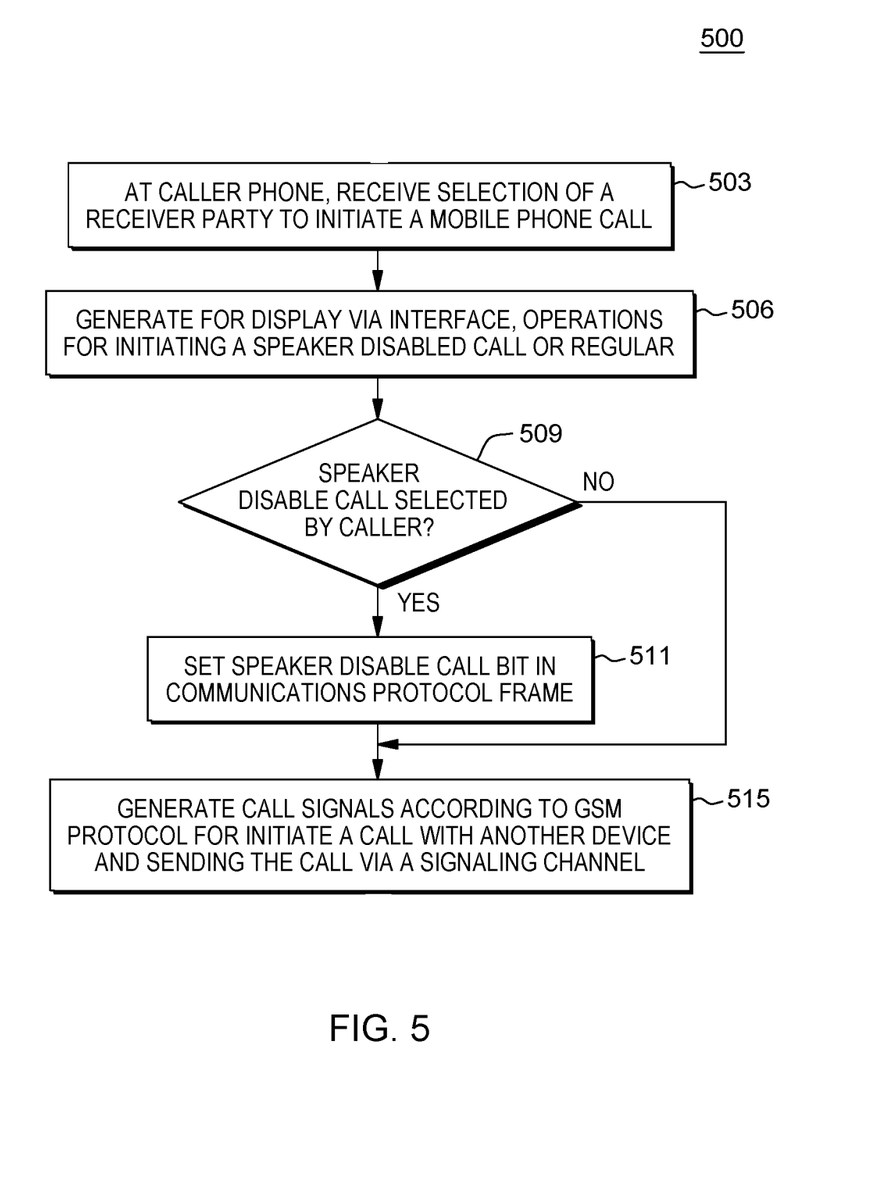
FIG. 5 depicts a method for operating the caller party's mobile device in accordance with one embodiment.

FIG. 5 depicts a method 500 for operating the caller C mobile device in accordance with one aspect of the invention. In the method, it is assumed the mobile device features of FIG. 1 includes the necessary software, firmware and/or operating system functions for carrying out the aspects for enhancing call privacy at mobile devices according to the embodiments herein.

At 503, the caller party caller C operates the phone 100C via the touch screen interface to select a party to receive the call. Responsive to receiving at the caller phone 100C a receiver R party selected to receive the call, the caller's mobile phone generates visual options for initiating a Speaker Disable call or regular phone call.

At 506, the software and/or operating system functions at the caller party caller C generates a display interface such as shown in FIG. 3, providing caller options to initiate sending the call under known conditions, or to initiate sending the call with enhanced privacy.

At 509, software and/or operating system functions at the caller C's device 100C determines whether the caller has selected the Speaker disable call option via the interface of FIG. 3.

If it is determined at 509 that the caller has not selected the Speaker disable call option for the current phone call set up via the interface of FIG. 3, then the process continues to step 515 to initiate sending the phone call over the communications network to a base station in accordance with regular communications protocol processing (e.g., GSM), i.e., sending the signals embodying the communication frames according to the protocol for establishing a communications channel, and initiate establishing a communications channel connection with the called party's phone device.

Figure 7A:
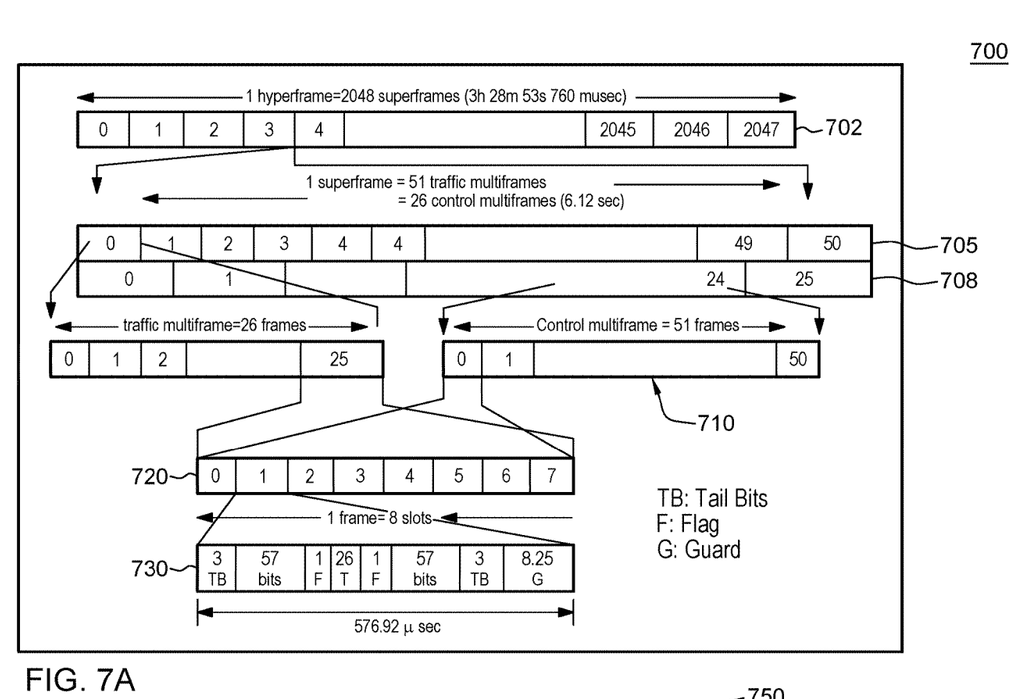
FIG. 7A shows a frame hierarchy according to a Time Division Multiplex Access (TDMA) communications protocol within which a control frame is populated with the Speaker Disable Flag set for communication to a receiver mobile phone device in one embodiment.

Otherwise, if it is determined at 509 that the caller has selected the Speaker disable call option via the interface of FIG. 3, then the system proceeds to 511 where microcontroller or CPU at the calling party's phone invokes functionality for setting the Speaker Disabled flag to "Y". Referring to FIG. 7A, in one non-limiting embodiment, this entails populating a bit in a control multi-frame communications signal according to a call control (CC) protocol of a Connection Management (CM) application sub layer of the GSM signaling protocol layer of the International Standards Organization (ISO)/Open systems Interconnection (OSI) model.

In particular, FIG. 7A shows a frame hierarchy 700 according to Time Division Multiplex Access (TDMA) communications protocol communication call signals showing a hyperframe 702 which is the highest level unit of the GSM time hierarchy and made up of plural superframes 705, where each super frame includes either 51 traffic multiframes or 26 control multiframes 708. The speaker disable flag bit may be set in a control multiframe 710. Each frame 720 of the control multiframe 710 includes eight slot, each slot having a plurality of bits.

Figure 7B:
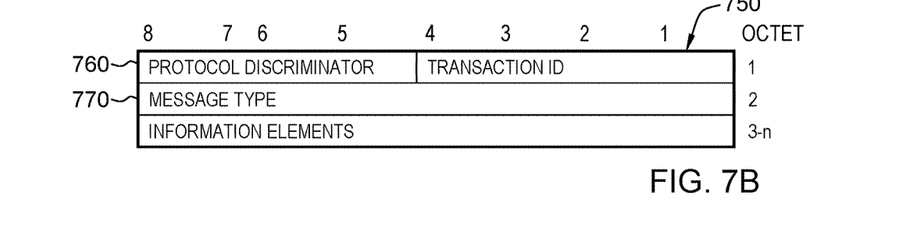
FIG. 7B depicts the enhanced calling privacy flag as a bit set in a call control (CC) protocol frame 750 in the GSM protocol for inclusion in a slot.

In one embodiment, as shown in FIG. 7B, the enhanced calling privacy flag is a bit set in a call control (CC) protocol frame 750 in the GSM protocol for inclusion in a slot. This control frame is one of the protocols of the Connection Management (CM) sub layer. According to the CC protocol frame structure, multiple octets of bits are shown including at least a first octet 760 including information such as a Protocol Discriminator that identifies the CC protocol and a Transaction ID that identifies who allocated the TI value for this transaction. The second octet 770 may include a Message type and in one embodiment, the flag bit is set in the second octet which is obtained by the device CPU for automatically initiating disabling the speaker and Aux port of the receiver device. This control bit may be a reserved bit (such as an extension bit) and is set at a calling device in a pre-defined location in the second octet 770 of the control frame, e.g., the eighth bit. This frame is communicated by the device 100 as part of the establishing a communications channel over a network.

Figure 8:
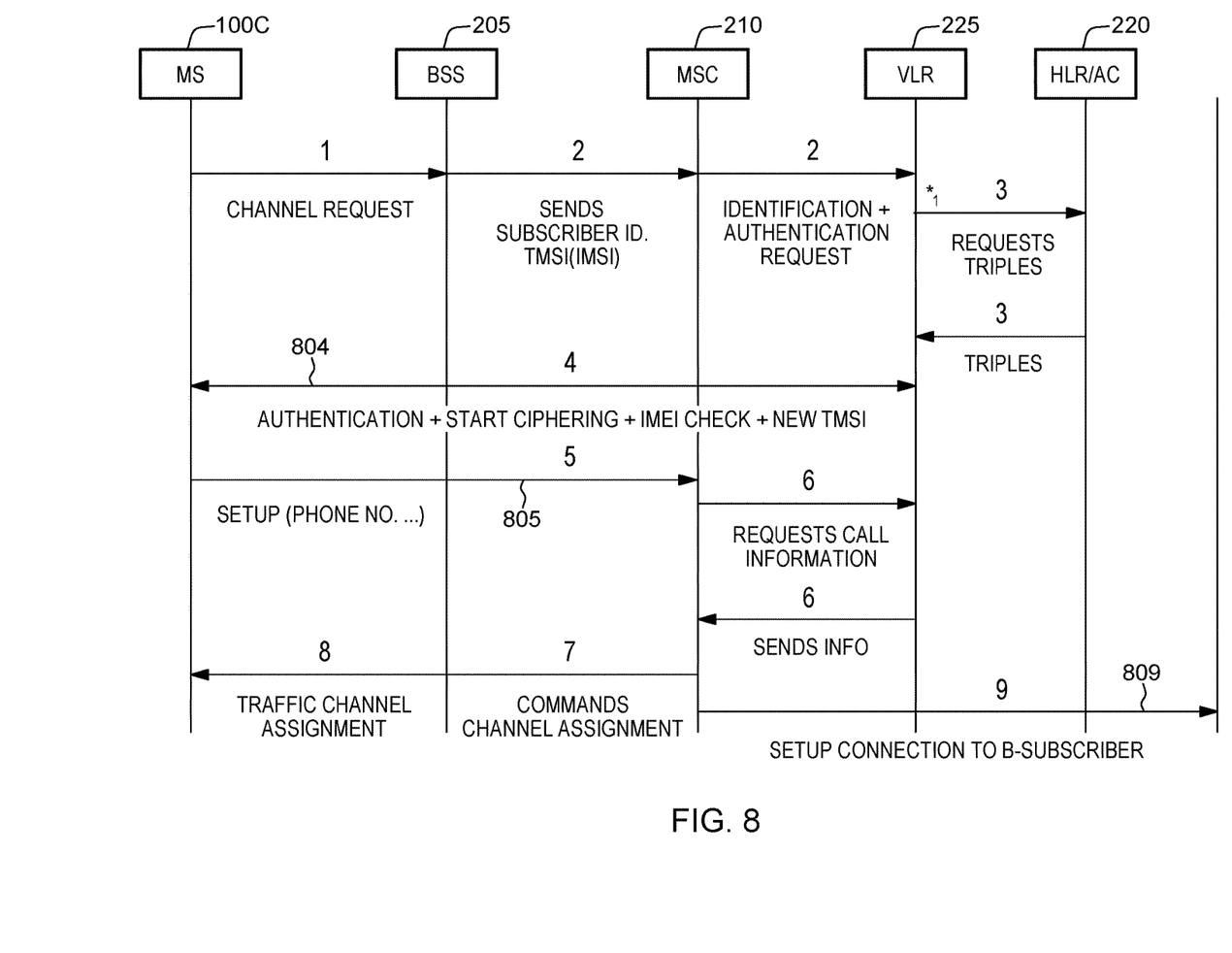
FIG. 8 depicts an abbreviated call-flow diagram for establishing cellular communications over a network according to the GSM communications protocol in one embodiment.

FIG. 8 depicts an abbreviated call-flow diagram 800 for establishing cellular communications over a network according to the GSM communications protocol and communicating the CC protocol frame 700. Particularly depicted are call set-up routing between the mobile device and the BBS 205 and between the BBS 205 and the MSC 210 network elements and between the MSC 210 and VLR 225 network elements for establishing a communications channel. Once a communications channel is set up between the calling mobile device 100C and the VLR 225 at step 804, call flow steps are initiated at 805 to setup the call and communicate the calling number of the called party (at device 100R) to the MSC 210 for mobile device communication. The call connection is eventually made when the mobile service switching centre (MSC) 210 initiates the network switching to set up the call between caller C (calling party) and caller R (called party) via the network at 809. In one embodiment, for the call flow sequence involving operations at 805 and 809, the calling party's mobile device is configured to send the CC protocol frame having the enhanced privacy bit flag set to control/disable the audio signal output features at the receiving mobile device.

Returning to FIG. 5, in an embodiment, the Speaker Disabled flag control bit is set and communicated over a call management (CM) application layer protocol frame when the call is transmitted to the network for forwarding to the receiver party device. Then the process proceeds to step 515 in order to sending the signals embodying the communication frames according to the protocol for establishing a communications channel, and initiate establishing a communications channel connection with the called party's phone device, e.g., according to the GSM protocol.

Figure 6A:
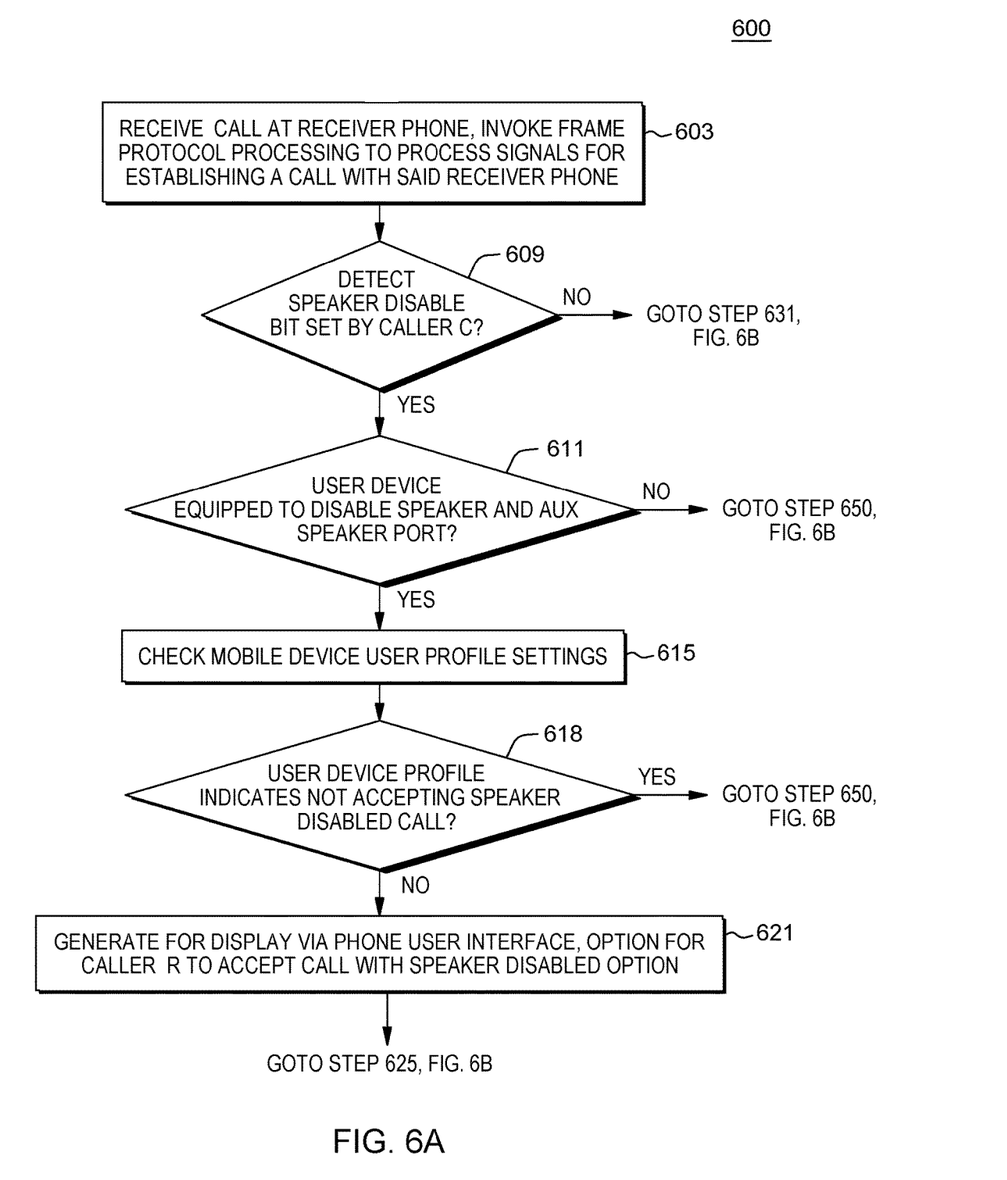
FIGS. 6A-6B depict a method for operating the called party's mobile device for enhancing privacy in accordance with one embodiment.
Figure 6B:
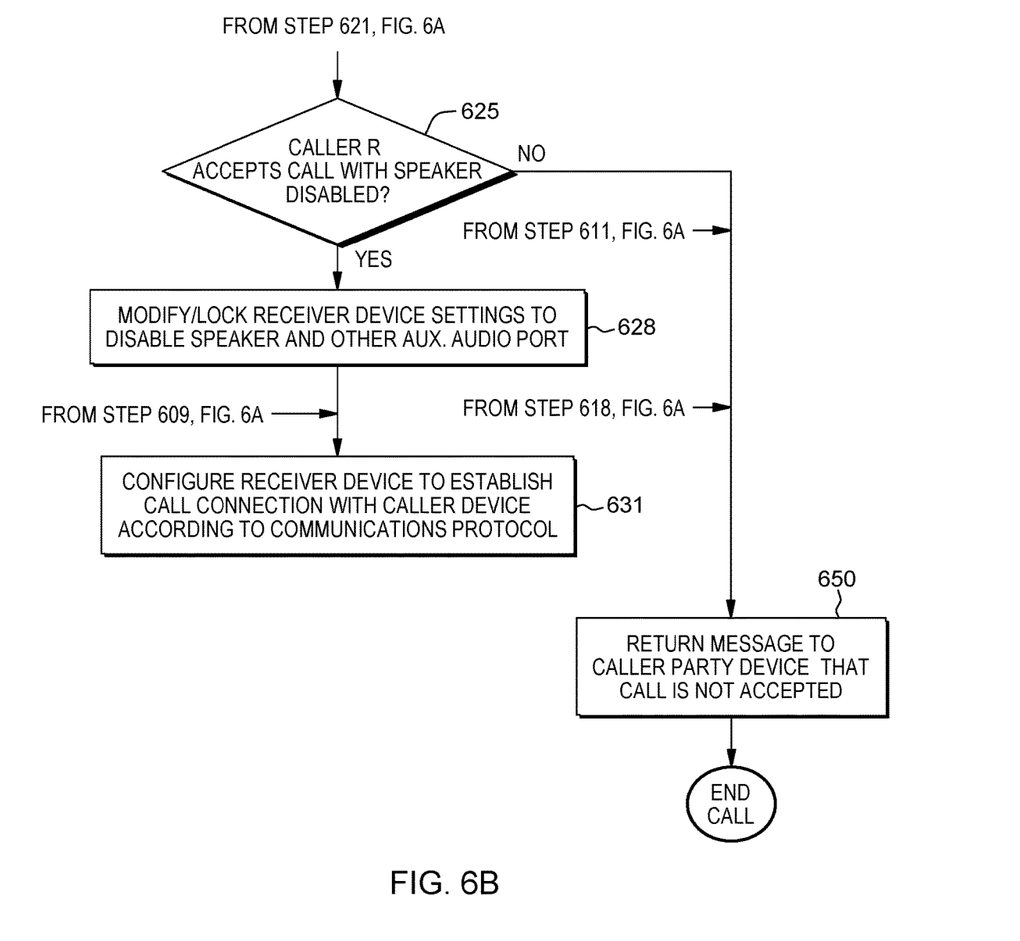

FIGS. 6A-6B depict a method 600 for operating the caller R (called party's) mobile device in accordance with one embodiment.

At 603, the called party (receiver) phone device receives call setup communication signals from a base station with information according to a communications protocol for establishing a communications channel with the initiating caller C (calling device). Caller R's receiver phone processor and RF subsystem responsively invokes communications protocol processing to process the received signals for establishing the call setup.

At 609, the called party's phone processor invokes processing to obtain from a received communications frame, a particular time slot having one or more control bits set. The processor checks whether the speaker-disable bit has been set in that particular time slot.

If at 609, it is determined that the speaker-disable bit has not been set, then the process proceeds to step 631, FIG. 6B where the called party's mobile phone receiver is configured to establish call connection with caller device according to communications protocol. In this instance, the mobile phone device's speaker settings are not disabled. Otherwise, returning to step 609, FIG. 6A, if it is determined that the speaker-disable bit has been set by the caller C's phone, then the process proceeds to step 612.

At 612, the processor at the called party's mobile phone receiver determines as a threshold instance, whether the phone is equipped to disable the speaker and the auxiliary speaker port or otherwise restricted from disabling the speaker and output port settings. If the called party's phone is not equipped to disable the speaker and the auxiliary speaker port, then the process proceeds to step 650, FIG. 6B where a return message is sent back to the caller party device that call is not accepted and the call will terminate. Otherwise, at 612, if it is determined by the processor at the called party's mobile phone that the called party's phone is equipped to disable the speaker and the auxiliary speaker port, then the process proceeds to step 615 to check the user profile settings at the called party device.

In an embodiment, a check is made of the user's profile setting at the mobile phone device that contain settings to manage e-mail accounts, passcode options, and many other functions of the user's mobile phone. In particular, a check is made as to whether a user profile setting indicates whether the party does or does not accept speaker disabled or privacy enhanced phone calls. This profile setting may be established by the called party in advance of receiving phone calls. In such a case, based on the profile setting, the system will automatically reject the call, and not wait for the user to physically reject the call. The call will not go through and a channel will not be established.

Thus, proceeding to step 618, FIG. 6A, a determination is made by the processor as to whether the mobile device user profile settings indicate that user (Caller R) does not accept speaker disabled calls (i.e., a user restriction), then the process proceeds to step 650, FIG. 6B where a return message is sent back to the caller party device that call is not accepted and the call will terminate.

Subject to a service being provided by a service provider party (not shown), in a further embodiment, if a subscriber chooses to disable or refuses such speaker disabled calls and this disable option is stored in the Caller's profile, the caller party C could receive a call reject note/message even before the call reaches the receiver's mobile device.

Otherwise, at 618, FIG. 6A, if it is determined by the processor at the called party's mobile phone that the user profile settings indicate that user (Caller R) does accept speaker disabled calls, then the process proceeds to 621 where the mobile phone processor is programmed to generate via the phone user interface display, an option for caller R to accept the phone call (from Caller C) with speaker disabled option.

The process then proceeds to 625, FIG. 6B where a determination is made as to whether the caller R accepts the call with the speaker disabled for enhanced privacy. If, at 625, it is determined that the caller R does not accept the initiated mobile phone call with the speaker disabled, then the process proceeds to step 650 where a return message is sent back to the caller party device that call is not accepted and the call will terminate.

Otherwise, if, at 625, it is determined that the caller R does accept the initiated mobile phone call with the speaker disabled, then the process proceeds to 628 where the processor at the called party's phone responsively modifies/locks the receiver device settings to disable speaker and other auxiliary audio output port. This may be accomplished in software or firmware at the mobile phone device, or may be an operating system function. In non-limiting embodiments, to disable the speaker, the on-board microcontroller device disables or switches out the respective output audio signal paths that feeds the respective external speaker and output auxiliary speaker at the mobile device; otherwise, steps may be performed to deactivate an audio signal driver circuit used to power the external speaker and output auxiliary speaker at the mobile device. Additional steps taken by the on-board microcontroller device include disabling or de-activating the wireless signal drive circuit or signal path that feeds the audio signal to the RF subsystem so that Blue-tooth or other wireless signals may not be transmitted that can carry the audio output signal. Then, the process will proceed to 631, FIG. 6B where the communications processing is completed to configure the mobile phone receiver to establish call connection with caller mobile phone device over a communications channel established according to the communications protocol.

Thus, the system and methods herein provide an enhanced call privacy solution to implement a speaker disabled call initiated by the sender phone (caller party) with the inclusion of a flag to indicate the desired feature in the signaling mobile channel of the network which would be processed and carried over by the network to the receiving phone terminal. The destination mobile phone terminal resolves the flag to modify device settings in the receiver end to disable speaker and other audio extension ports thus providing more control to the caller preventing mishandling of the call at the receiver's end.

Before attending the call, the receiver also would know that it is a speaker disabled call. If such call is not possible at the receiver's end due to device and/or user's restrictions, sender is notified that such call cannot be established.

In a non-limiting example, one real life situation implementing functionality for enhanced mobile phone call privacy may be a telephonic interview where the candidate attending the interview from a remote location is required not to expose the call conversation from the interviewer over speakers.

There are always situations where a speaker mode may be turned on accidentally on the receiver's end while communicating confidential or sensitive message. There are also situations where the receiver would deliberately do this in cases like telephonic interviews which is not exposed to the caller. The system and method herein ensures privacy of audio calls not getting exposed over the speakers/in public accidentally or deliberately.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for enhancing mobile cell phone privacy comprising:
   receiving, at a mobile phone device, signals from a calling party mobile device communicated over a network for initiating a phone call with a called party, said received signals including a flag bit set for enhancing privacy of said call received at said mobile phone device;
   determining, at a processor of said mobile phone device, a presence of said set flag bit from said received initiating phone call signals;
   generating for display at a phone device interface at said mobile device, responsive to said determining, user-selectable choices for either accepting the calling party's call with an enhanced privacy indicator or not accepting the call;
   responsive to a user accepting the call from said calling party with said enhanced privacy indicator via said interface, modifying, using said mobile phone processor, a mobile phone device setting that disables a speaker and disables an audio extension port,
   wherein a call set up for the accepted call is established with said mobile phone device settings modified.

2. The method of claim 1, wherein responsive to a user at said mobile device not accepting the call with enhanced privacy setting, generating, by said mobile device, signals for communication over said communications channel for terminating said call set up, and notifying said mobile device of said initiating calling party that such call can not be established.

3. The method of claim 1, wherein, prior to generating said display with user-selectable choices, determining whether said mobile device of said called party is not equipped to read said flag bit or modify said mobile device setting that disables a speaker and disables an audio extension port; and if determined that the device is not equipped, generating, by said mobile device, signals for communication over said communications channel for terminating said call set up, and notifying said mobile device of said initiating calling party that such call can not be established.

4. The method of claim 1, wherein, prior to generating said display with user-selectable choices, determining whether a profile of said called party associated with said mobile device indicates a setting not to accept calls for enhancing privacy, responsive to said profile setting, generating, by said mobile device, signals for communication over said communications channel for terminating said call set up, and notifying said mobile device of said initiating calling party that such call can not be established.

5. The method of claim 1, wherein said modifying said mobile phone device setting comprises: one or more of: disabling the output audio signal path that feeds the external speaker and output auxiliary speaker at the mobile device, deactivating an audio signal driver circuit used to power the external speaker and output auxiliary speaker at the mobile device, or preventing a wireless signal including an audio signal from being transmitted via a wireless communications output.

6. The method of claim 1, wherein said preventing said audio signal from being transmitted comprises: disabling or de-activating a wireless signal drive circuit or signal path that feeds an audio signal to the RF subsystem so that Blue-tooth or other wireless signals may not be transmitted that can carry the audio output signal.

7. The method of claim 1, wherein said call flag bit is set in a control frame communicated over a communications channel according to a communications protocol, said frame having multiple octets of bits, one of said octets including said bit flag to be set by a call party device, said method further comprising:
   demodulating, at said mobile phone device, said received signals to obtain control frame data signals,
   perform analog to digital signal processing of said call frame data signals to obtain said multiple octet of bits from said received signals; and
   reading, by the mobile phone processor, said flag bit set in a specific location of said multiple octet of bits.

8. The method of claim 1, said method further comprising:
   controlling said processing unit for reading said flag bit at said mobile device by an operating system program running at said mobile phone device, a software application running at said mobile phone device, or firmware operating at said mobile phone device.

9. A method for enhancing mobile cell phone privacy comprising:
   initiating, via an interface at a mobile phone device of a caller, a speaker disabled call with a receiver mobile phone of a called party at a location remote from a location of the caller;
   setting, in response to said initiating, via a processor at the mobile phone device of a caller, a flag bit in a signal used for initiating the speaker disabled phone call with the receiver mobile phone of the called party according to a communications protocol; and
   communicating said signal and said flag bit over a communications channel-network for establishing a phone call with the receiver mobile phone device of the called party at the remote location over a network, wherein responsive to reading a flag bit set in the called party mobile device of a called party, activating a processor at said called party mobile phone to modify a mobile phone device setting that disables a speaker and disables an audio extension port;

wherein a call channel is established with said receiver mobile phone device settings modified to enhance calling party privacy at said called party's mobile phone device at the remote location.

10. The method of claim 9, further comprising:
generating, by said processor unit on said caller's mobile phone device, an interface display providing user selectable option for initiating a speaker disabled call or regular call with said called party's mobile device;
and responsive to selecting said speaker disabled call option via said interface, the processor at a mobile phone device of a caller setting said flag bit in said signal.

11. The method of claim 9, wherein said call flag bit is set in a control frame communicated in said signal over a communications channel according to a communications protocol, said frame having multiple octets of bits, one of said octets including said bit flag in a specific location to be set by the caller party device for enhancing caller privacy.

12. The method of claim 9, wherein a called party refuses to accept said phone call with enhanced calling party privacy or said called party's' mobile phone is incapable of disabling a speaker and/or an audio extension port, said method further comprising:
receiving, by said processor unit on said caller's mobile phone device, via an interface display, a message that said call channel cannot be established.

13. A mobile phone apparatus with enhanced privacy for a calling party, the apparatus comprising:
a Radio Frequency sub-system for receiving signals from a calling party mobile device communicated over a network, said signals for initiating a phone call with a called party, said received signals including a flag bit set for enhancing privacy of said call received at said mobile phone device;
a processor of said mobile phone device running program code for determining presence of said set flag bit from said received initiating phone call signals;
a display at said mobile device, wherein, responsive to determining presence of said set flag bit from said received initiating phone call signals, said processor generating for said display a user-selectable choice of either accepting a call with an enhanced privacy indicator for said calling party or not accepting the call;
the mobile phone processor, in response to a user selecting accepting the call with said enhanced privacy indicator, modifying the mobile phone device setting that disables a speaker and disables an audio extension port,
wherein a call set up for the accepted call is established with said mobile phone device settings modified.

14. The mobile phone apparatus of claim 13, wherein responsive to a user at said mobile device not accepting the call with enhanced privacy setting, said mobile phone processor generating signals for communication over said communications channel for terminating said call set up, and notifying said mobile device of said initiating calling party that such call can not be established.

15. The mobile phone apparatus of claim 13, wherein, prior to generating said display with user-selectable choices, said mobile phone processor determining whether said mobile device is not equipped to read said flag bit or modify said mobile device setting that disables a speaker and disables an audio extension port; and if determined that the device is not equipped, said mobile phone processor generating signals for communication over said communications channel for terminating said call set up, and notifying said mobile device of said initiating calling party that such call can not be established.

16. The mobile phone apparatus of claim 13, wherein, prior to generating said display with user-selectable choices, determining whether a profile of said called party associated with said mobile device indicates a setting not to accept calls for enhancing privacy, and responsive to said profile setting, said mobile device processor generating signals for communication over said communications channel for terminating said call set up, and notifying said mobile device of said initiating calling party that such call can not be established.

17. The mobile phone apparatus of claim 13, wherein said mobile phone processor modifies said mobile phone device setting by one or more of: disabling the output audio signal path that feeds the external speaker and output auxiliary speaker at the mobile device, deactivating an audio signal driver circuit used to power the external speaker and output auxiliary speaker at the mobile device, or preventing a wireless signal including an audio signal from being transmitted via a wireless communications output.

18. The mobile phone apparatus of claim 17, wherein to prevent said audio signal from being transmitted, said mobile phone processor disabling or de-activating a wireless signal drive circuit or signal path that feeds an audio signal to the RF subsystem so that Blue-tooth or other wireless signals may not be transmitted that can carry the audio output signal.

19. The mobile phone apparatus of claim 13, wherein said call flag bit is set in a control frame communicated over a communications channel according to a communications protocol said frame having multiple octets of bits, one of said octets including said bit flag to be set by a call party device, said RF subsystem further comprises:
a demodulator circuit for demodulating said received signals to obtain control frame data signals,
an analog to digital signal processing circuit to obtain said multiple octet of bits from said control frame data signals, the mobile phone processor reading said flag bit set in a specific location of said multiple octet of bits.

20. The mobile phone apparatus of claim 13 wherein said mobile phone processor for reading said flag bit is controlled by an operating system program running at said mobile phone device, a software application running at said mobile phone device, or firmware operating at said mobile phone device.

* * * * *